UNITED STATES PATENT OFFICE.

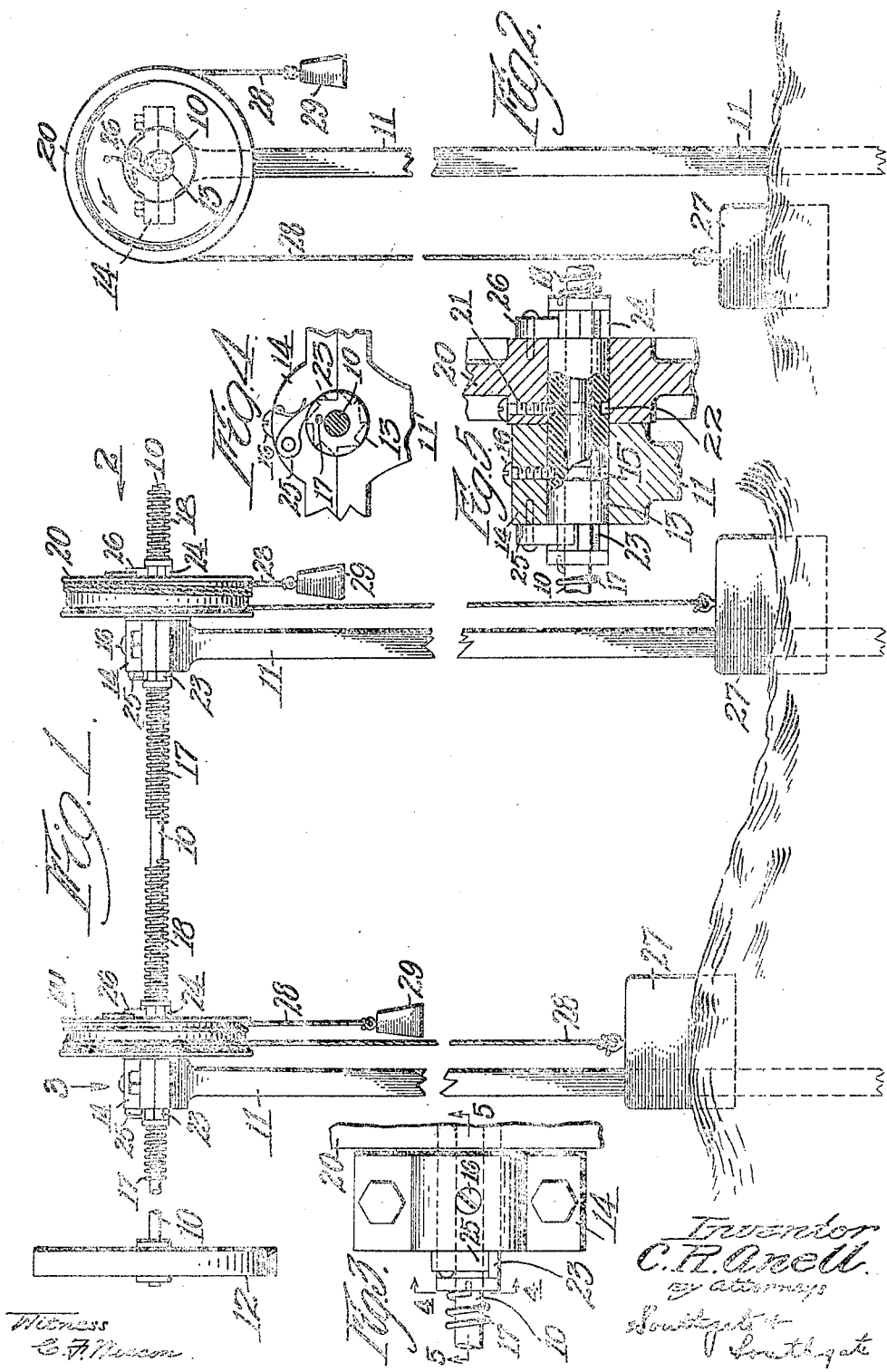

CARL R. ANELL, OF WORCESTER, MASSACHUSETTS.

WAVE-MOTOR.

1,292,223.

Specification of Letters Patent.

Patented Jan. 21, 1919.

Application filed March 12, 1918. Serial No. 222,026.

*To all whom it may concern:*

Be it known that I, CARL R. ANELL, a citizen of the United States, residing at Worcester, in the county of Worcester and State of Massachusetts, have invented a new and useful Wave-Motor, of which the following is a specification.

This invention relates to a wave motor of the general type in which floats are lifted by the waves and generate power as they descend after the wave has passed from beneath them.

Such motors have been heretofore known in which the power is transferred from each float through a ratchet or clutch mechanism to a rotatable shaft. Preferably two or more floats are connected to turn a single shaft, and in such prior machines the ratchet or clutch mechanism has formed a positive driving connection between each float and the rotatable shaft. The rotation of the shaft has thus been effected directly by the weight of the floats connected thereto, and a float which was not sufficiently heavy to rotate the shaft was merely suspended in air until enough other floats were raised so that their combined weight would move the shaft. They then descended together rotating the shaft at considerable speed, and the shaft then remained at rest until the combined weight of the suspended floats was again sufficient to rotate the shaft. The power derived from such a wave motor was thus extremely irregular.

It is the general object of my present invention to provide a wave motor of this general type so constructed that a much more regular and continuous delivery of power may be obtained.

With this general object in view, an important feature of my invention relates to the provision of storage or accumulation connections between each float and the common rotatable shaft so that increments of power too small to turn the shaft may be retained and accumulated until their combined action will produce such rotation, which rotation will then continue for a considerable period of time, during which period other floats will be successively raised, thus adding their power to continue the rotation of the shaft.

In the preferred form, such storage devices are in the nature of yielding or spring connections between the ratchet or clutch mechanism controlled by each float and the rotatable shaft.

Other features of my invention relate to arrangements and combinations of parts which will be hereinafter described and more particularly pointed out in the appended claims.

A preferred form of my invention is shown in the drawings, in which—

Figure 1 is a side elevation of a portion of my improved wave motor;

Fig. 2 is an end elevation thereof;

Fig. 3 is a partial plan view looking in the direction of the arrow 3 in Fig. 1;

Fig. 4 is a sectional end elevation taken along the line 4—4 in Fig. 3, and

Fig. 5 is a partial sectional side elevation taken along the line 5—5 in Fig. 3.

Referring to the drawings, I have shown a rotatable shaft 10 mounted upon a plurality of fixed posts or supports 11. These supports are to be firmly embedded in rock or cement foundations so that they may be rigidly retained in correct position. A pulley 12 fixed to the shaft 10 constitutes means by which power may be delivered from the motor.

A plurality of sleeves 13 (Fig. 5) are loosely mounted upon the shaft 10, said sleeves being rotatable in fixed bearings 14 in the upper ends of the supports 11. Suitable means is provided for preventing axial movement of each sleeve in its bearing, which means may consist of an annular groove 15 extending around the sleeve and positioned to receive the end of a screw 16 threaded into the upper part of the bearing 14. It will be understood, however, that any other suitable or convenient means may be provided for preventing such axial movement.

Each sleeve 13 is connected to the shaft 10 by storage or accumulator devices, shown as coil springs 17 and 18, each connected at one end to the sleeve (Fig. 5) and at the opposite end to the shaft as shown in Fig. 1. It will be understood that the two coil springs are illustrative only and that my invention contemplates the use of other common and convenient yielding or storage connections between the sleeve and shaft. In some instances a single spring 17 may be found sufficient.

A pulley 20 is rotatable on each sleeve 13 adjacent the bearing 14, said pulley being held from axial movement on the sleeve by a screw 21 extending into an annular groove 22 in the sleeve, or by other suitable means. Each pulley is therefore freely rotatable upon its sleeve and the sleeve in turn is freely rotatable within its bearing and also in relation to the shaft 10, except as such rotation is retarded by the action of the springs 17 and 18.

Ratchet teeth 23 and 24 are provided at each end of each sleeve 13, the teeth 23 coöperating with a pawl 25 mounted on the bearing 14, and the teeth 24 coöperating with a pawl 26 mounted on the pulley 20. A float 27 is suitably connected, as by a rope 28, to each pulley 20, the rope passing over the pulley and having a small weight 29 connected to its free end. The pawl 26 is so disposed that the weight 29 can freely rotate the pulley backward, thus taking up the slack of the rope 28 as the float 27 is raised by a wave. When the float descends, however, the pawl connects the pulley positively to the sleeve 13 and yieldingly through the springs 17 and 18 to the shaft 10. The float in descending, therefore, places increasing tension upon the springs 17 and 18, which tension if sufficient in strength will rotate the shaft 10 and pulley 12. If the tension of this particular float is not sufficient to turn the shaft the power will be stored in the springs and will be retained therein by the fixed pawl 25 which prevents backward movement of the sleeve 13 when the float again rises and the weight 29 again takes up the slack of the rope. At each movement of the float 27, therefore, a certain amount of power is stored in the yielding connections between the corresponding sleeve 13 and the shaft 10.

It will be understood that my invention contemplates the use of a considerable number of such floats arranged along an extended shaft 10 or along two or more such shafts suitably connected by belts or gearing to deliver power at a single point. Each one of the floats in the entire group will thus be intermittently adding its increment of power to the system, and in the event that a float descends and rotates its pulley faster than the shaft 10 is moved by the combined effect of all the floats, the power delivered from a particular float is stored in the springs and continues to be given out while the associated float is again rising to deliver additional power. The storage or accumulator connections therefore provide for a much more regular and efficient delivery of power from a wave motor of this type than has been heretofore secured.

Having thus described my invention, it will be evident that changes and modifications can be made therein by those skilled in the art without departing from the spirit and scope thereof as set forth in the claims, and I do not wish to be otherwise limited to the details herein disclosed, but what I claim is:—

1. A wave motor comprising a plurality of floats, a plurality of rotatable members, each member being rotatable in one direction by a falling float, means to positively prevent backward movement of each member, a rotatable shaft, and separate power accumulating springs between each of said members and said shaft, all of said springs being continuously and operatively connected to turn said shaft in a single direction.

2. A wave motor comprising a rotatable shaft, a plurality of sleeves loose on said shaft, separate continuous power accumulating connections between each sleeve and said shaft, a fixed bearing for each sleeve, a pulley rotatable on each sleeve, ratchet connections between each sleeve and its bearing, additional ratchet connections between each pulley and its sleeve, a float connected and effective to rotate said pulley and sleeve in one direction, and a relatively light weight effective to turn said pulley freely in the reverse direction as the float rises, whereby said shaft is driven at all times by the aggregate tension of all of said separate power accumulating connections, regardless of the positions of the separate floats.

In testimony whereof I have hereunto affixed my signature.

CARL R. ANELL.

Copies of this patent may be obtained for five cents each, by addressing the "Commissioner of Patents. Washington, D. C."